March 15, 1960  F. KLOPP  2,928,244
HYDRAULIC DRIVE OF RECTILINEAR ALTERNATING MOTION
Filed April 24, 1958  3 Sheets-Sheet 1
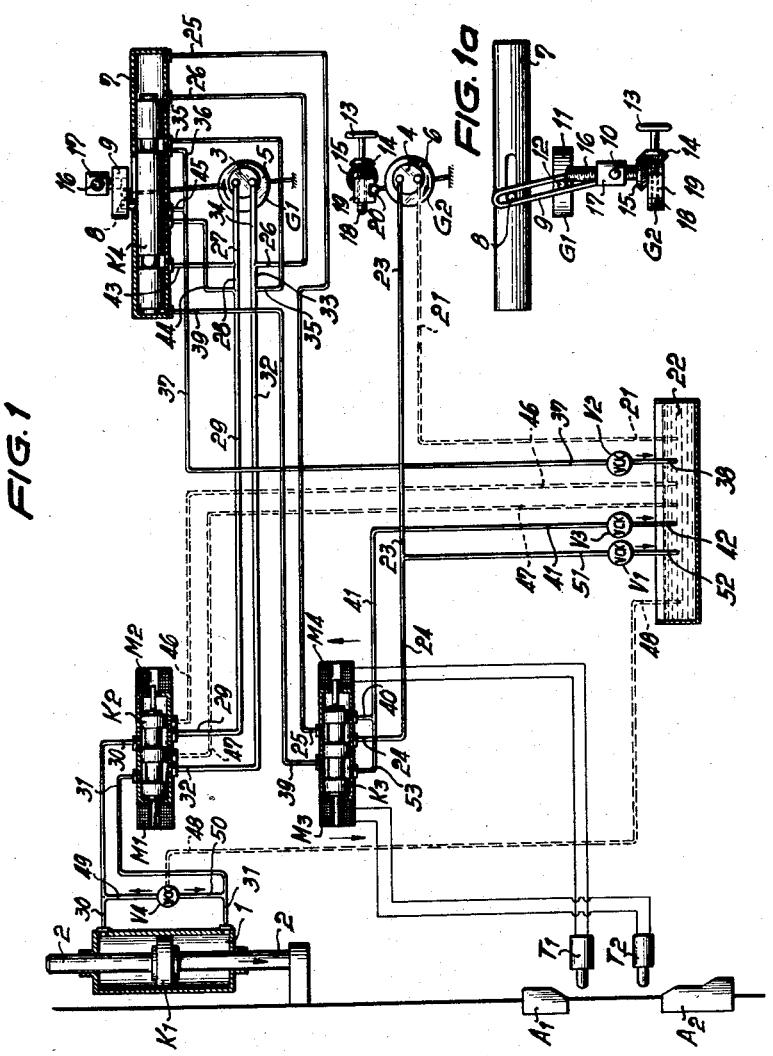
INVENTOR
FRIEDRICH KLOPP
BY
Harness, Dickey & Pierce
ATTORNEYS

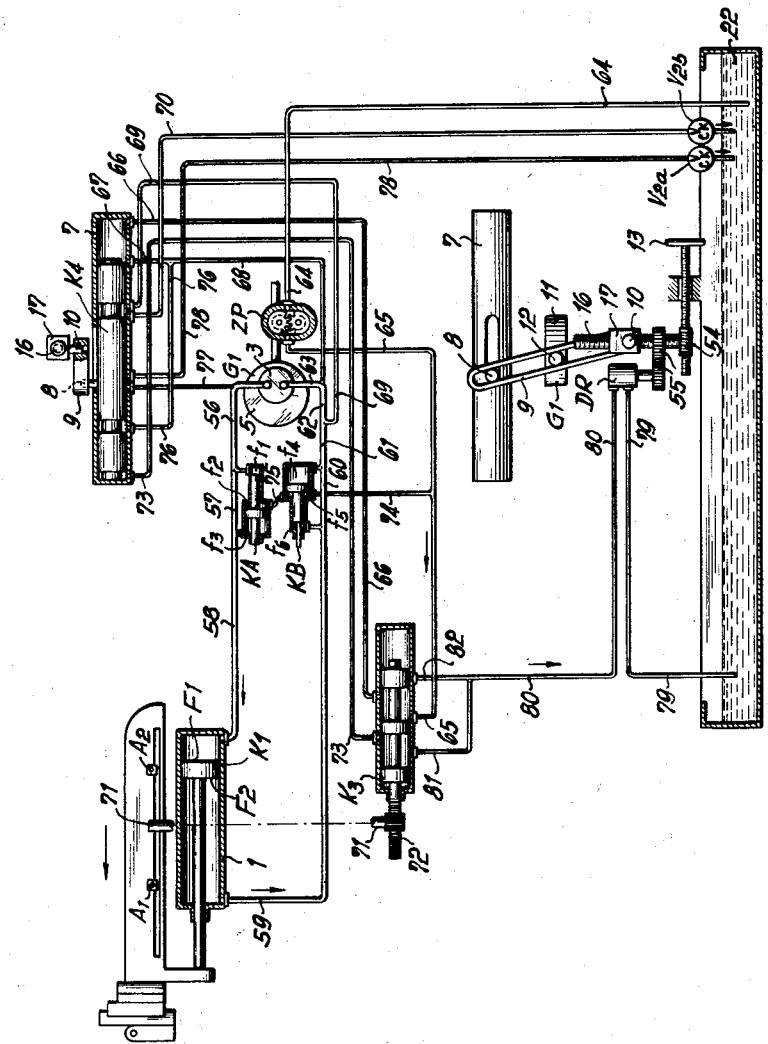

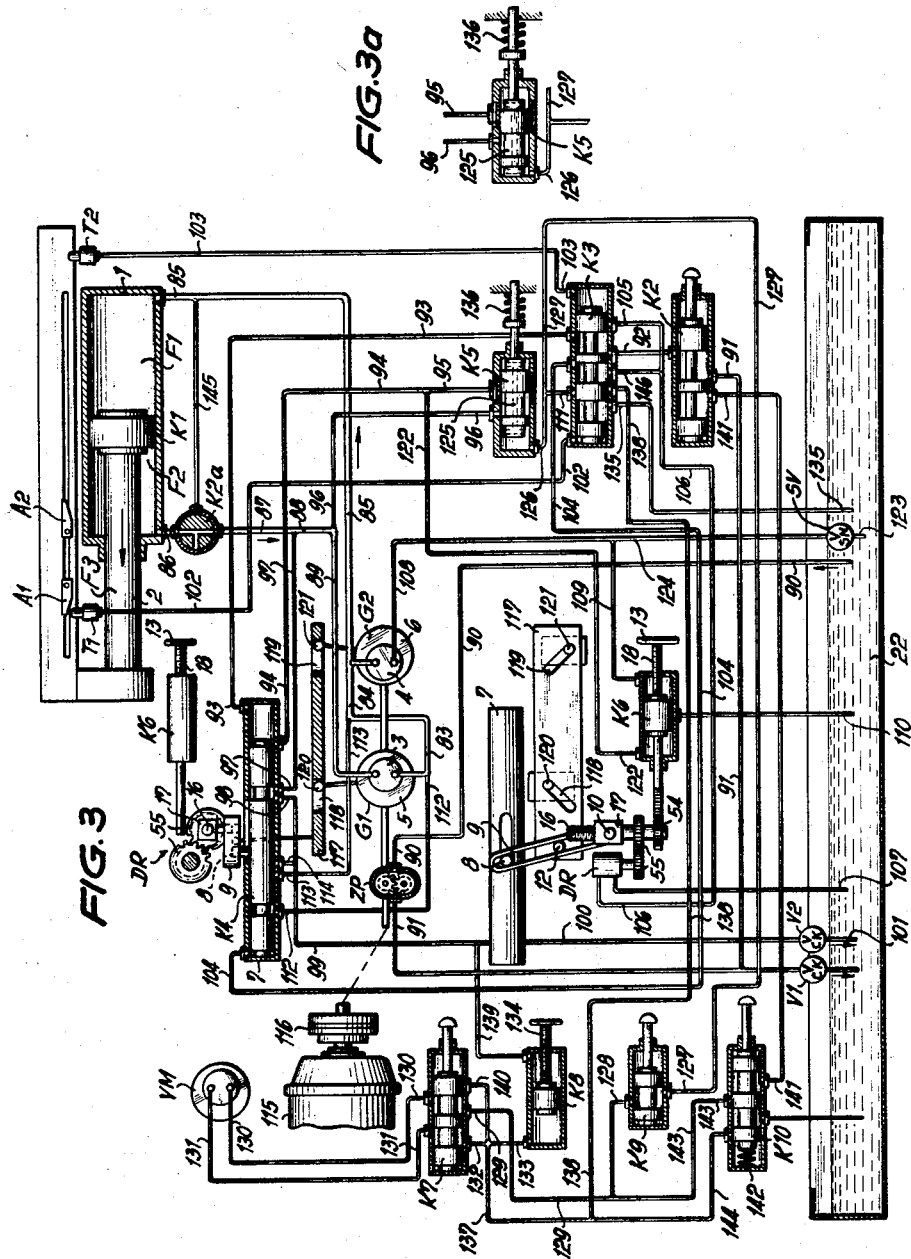

United States Patent Office 2,928,244
Patented Mar. 15, 1960

2,928,244

HYDRAULIC DRIVE OF RECTILINEAR ALTERNATING MOTION

Friedrich Klopp, Solingen-Wald, Germany

Application April 24, 1958, Serial No. 730,567

Claims priority, application Germany April 27, 1957

18 Claims. (Cl. 60—52)

The invention relates to hydraulic drives for rectilinear alternating motion and to their reversing gear, particularly for reciprocating machines, especially machine tools such as planing machines and the like.

It is known to actuate the reversing gear with a rectilinear alternating motion preferably by means of control slide valves or also by means of rotary slide valves or other valve control arrangements. The fundamental disadvantage of all of these controls is based upon two reasons. During the reversal, a stationary period occurs for the machine element which is to be driven with a rectilinear alternating motion. This stationary period is caused by the time required for shifting or rotating the control valve. The pressure oil flow must be satisfactorily shut off by the control valve. This shut-off movement is a dead travel and the operating time of this dead travel involves a standstill period.

Moreover, control travels of the control valve are necessary for accelerations and decelerations of the piston of the machine to be alternately driven which on the one side do not conduct the full oil stream to this piston drive and which on the other side throttle the displaced oil stream before reversal. Both acceleration and deceleration occur through throttle action. It can thus be said that the control of a rectilinear alternating motion by means of a valve member completely converts the deceleration energy into heat by throttle action. Regarding the acceleration energy, a part is likewise converted into heat. It is thus not possible with this kind of control to achieve the desired high numbers of strokes for the particular stroke velocity, since during the reversal considerable standstill periods occur through dead travel. This is particularly apparent with short to middle range alternating motions, since very many reversals occur, which by their standstill periods impose considerable losses on the number of strokes.

It is also not possible with these known controls to increase the stroke velocities, since the throttling for acceleration and, in particular, for deceleration involve considerable heating of the oil.

It is also known to reverse a rectilinear alternating motion by the pump (hydraulic pressure generator) itself, by controlling it through a zero setting and so reversing the direction of flow. This was hitherto only carried out in that, on reversal, the appropriate exhaust side was connected to the oil reservoir, so that oil could pass from the circuit, which was then extracted again by the pump. Such infinitely variable stroke pumps are known in many varieties. In these pumps a set of cylinders is carried by the driven shaft, the pistons or vanes being reciprocated in the case of a radial type by reason of their engagement with a ring adjustably displaceable eccentrically in relation to the said cylinders, or, in the case of an axial type of pump, by reason of their connection with a tiltable plate. Pumps of this kind are e.g. disclosed in the following U.S. Letters Patent:
2,405,600 (Morris). Here the stroke of a set of axial pistons is altered by a tiltable wobble plate.

1,152,729 (Selby Hele-Shaw). Here the pistons are provided in a radial plane.
2,186,409 (Ferris). The pistons are likewise arranged in a radial plane.
2,139,965 (Ljungström). Here rotor vanes are arranged instead of plunger pistons.
2,525,498 (Naylor and Fieldhouse).
2,525,979 (Vickers).
2,699,123 (Bonnette et al.).

Therefore such pumps are so generally known that a detailed description of the pump itself may be dispensed with.

In most drives for rectilinear alternating motions, moreover, the piston rods only project from one side of the cylinder. The constructional length of this arrangement is twice the size of the stroke. With a piston rod projecting on both sides, the constructional length is three times as great as the stroke. Frequently, however, with a rectilinear alternating motion, only one direction of movement is used for the working stroke. The other direction of movement is an idle stroke. With this arrangement of a piston drive having a piston rod projecting at one side, it was previously only possible to employ a half-open circuit. The relevant exhaust side was to be connected to the oil reservoir, in order to displace oil or recycle it. Braking on deceleration was therefore only possible with this system by means of a throttling action; the braking energy was also thus likewise converted into heat. Acceleration with this system was effected without loss by a "through-zero" control of the pump or generator by means of the generator itself.

Theoretically the deceleration stroke of the driven machine element, e.g. a ram or a table, must occur in the exact time sequence of the over-zero control of the generator. This was not practicable hitherto, particularly because the velocities can change continuously and very often the moved masses are considerably different. The deceleration energy produced by the action of a throttle or counterpressure valve should undergo a continual variation, which could not be obtained. If for example, deceleration of the machine followed setting of the generator too slowly, the ram or the table speeded up and a vacuum was produced in the preceding direction of flow. The converse occurred if the ram or table came to rest, through too sharp a deceleration (braking), more rapidly than the pump (generator) was reversed. The vacuum was then produced at the preceding exhaust side. These hitherto uncontrollable processes in reversal led to entry of air during the reversing, which made the whole drive sensitive to vibrations.

On reversal of a rectilinear alternating motion by valve members, it was previously possible to obtain a reversal accuracy of a few $\frac{1}{24}$ inch with respect to the whole control range. On reversal by means of "over-zero" control of the pump, however, a deviation of the reversal point of even 4 inches and more was considered satisfactory. For reversing the pump, an auxiliary pump (servo pump) is essential, which must be stressed very highly, since the rapid shifting of the pump (generator) requires a high pressure. This high servo-pressure was then conducted via an over-pressure valve during the working stroke of the machine, so that again considerable losses and oil-heating occurred.

A further disadvantage of all previously known hydraulic drives is that the separate constructional elements, such as the pump (generator), control gear, feed control, step-up gear and so on are not adapted in their function to reciprocal reverse operation. This does not allow any uniform principles of construction to be applied to hydraulic drives of different capacities, and hinders the optimum simplicity of a hydraulic driving mechanism.

By the present invention, the previously described disadvantages are avoided and a reversing gear is provided which:

(1) Permits the highest velocities;
(2) Does not convert the braking and deceleration energy into heat;
(3) Permits storage of the braking energy, in order to make it utilisable for further acceleration;
(4) Allows reversing accuracy to be obtained, which remains constant at all velocities;
(5) Ensures a great precision of the drive;
(6) Operates satisfactorily under all climatic conditions;
(7) Includes constructional elements which complement one another and co-operate in the alternating motion, so as to achieve an optimum simplicity in the drive;
(8) Includes only a small number of constructional elements;
(9) Involves no or only insignificant power losses;
(10) Makes it possible to apply principles of construction which are valid regardless of size, thus making it possible to construct both small-stroke and large-stroke drives for rectilinear alternating motions using the same principles of construction.

Further details and features of the present invention will appear in the following specific description of three embodiments given in conjunction with the accompanying drawings.

In the drawings:

Figs. 1 and 1a show a diagrammatic representation of a hydraulically-reversible drive for short strokes and low cutting forces of a reciprocating machine tool;

Fig. 2 shows a diagrammatic representation of a hydraulically-reversible drive for medium stroke and medium cutting forces of a reciprocating machine tool;

Fig. 3 shows a diagrammatic representation of a hydraulically-reversible drive for long strokes and high cutting forces of a reciprocating machine tool;

Fig. 3a shows the feed control valve K5 illustrated in Fig. 3 in its opposite driving position.

In the drawings, the same or corresponding parts are indicated by the same references.

In Fig. 1, the basic principle of the invention is illustrated in its clearest form. It is based upon an operating or working piston K1, which has two cylinder chambers of equal cross-section on either side within the cylinder 1, so that the same hydraulic fluid quantities are supplied and withdrawn in piston movements in either of the two possible directions. The same volumetric displacements on either side of the piston K1 are given by a piston rod 2 of exactly equivalent construction on both sides. The piston rod 2 is connected to the reciprocal machine element, e.g. the ram of a planing machine.

To produce a pressure oil stream for driving the operating piston K1 with a rectilinear alternating motion, a pump or generator arrangement is employed with two pumps or generators G1 and G2. In each of the two generators G1 and G2, a piston core 3 or 4 having a plurality of substantially radially arranged pistons is arranged which can be altered in its supply power by an eccentricity adjustment of the pump or generator housings 5 and 6 respectively. The pressure oil streams produced by the pistons of the two generator cores 3 and 4 are completely independent of one another as to pressure. The generator G1 is controlled through zero, i.e. according to the direction of movement of the operating piston K1 the generator G1 has either a positive or negative eccentric stroke, whereby the oil stream produced reverses its direction of flow. The generator G2 is not controlled through zero, but is adjusted in relation to the stroke of G1; i.e. with the greatest eccentric stroke of G1, in the positive or negative sense, G2 has its greatest eccentricity. With a half eccentric stroke of G1, positive or negative, G2 also has a half stroke. The eccentricity of G2, which is always positive, is thus always proportional to the eccentric stroke of G1, which is alternatively positive and negative.

The construction of this reversing gear of the generators G1 and G2 is as described in detail below:

A crank member 9 is connected at a central pin 8 to a reversing slide valve K4 within a valve housing. The pivot point of the crank member 9 is indicated at 10 (see Figs. 1a, 2). The adjusting member 11 of the generator G1 is introduced into the crank member by means of a pin 12. The pivot point 10 of the crank member is adjustable by a hand-wheel 13 by means of two bevel gear wheels 14, 15 on a threaded spindle 16 and a sleeve 17. The generator G2 is connected with this regulation by a threaded spindle 18 and a sleeve 19, in which the generator G2 is guided by a pivot bolt 20. On movement of the slide valve K4 from right to left or conversely, by means of the crank 9 the generator part G1 is pivoted from the positive eccentric stroke to the negative eccentric stroke or vice versa. These strokes and hence the supply amounts of the generator G1 in the two directions of flow are altered by adjustment of the pivot point 10 of the crank 9. The strokes of the generator G1 are at the greatest, when the pivot point 10 of the crank 9 is removed as far as possible from the pivot pin 12; the strokes of G1 are at the smallest, when the pivot point 10 is drawn as near as possible to the pivot pin 12. In the first case, the generator G2 also has its greatest stroke and in the second case its smallest stroke. The proportionality of the strokes G2 and G1 is ensured in the example by the rigid mechanical dependence in adjustment by the two threaded sleeves 17 and 19.

The mode of operation of the drive is as follows: The generator G2 extracts through a duct 21 from reservoir container 22 and supplies pressure oil, through the ducts 23, 24, a pre-control slide valve K3 and a duct 25, to the reversing valve K4. The reversing valve K4 is thereby brought into its left-hand position. In this end position, the pressure oil from G2 can flow to the duct 26 by a route-sequence or follow-up control (duct 26 will be connected to duct 25 by the slide valve K4 itself at the end of its left-hand stroke).

The pressure oil from G1 flows with this stroke via ducts 27, 28 and 29, a switch on and off control valve (switch valve) K2 and a duct 30 into the operating cylinder 1 and moves the operating piston K1 downwardly in the drawing. The oil displaced under the piston K1 flows back to the generator G1 through a duct 31, the control piston K2 and ducts 32, 33 and 34.

It is necessary to replace leakage oil between the pressure oil supplied to K1 and the exhaust oil withdrawn from K1. It is also necessary to flush or scavenge the oil located in the circuit of the generator G1, so that no unallowable heating of this circuit occurs. Also, it is necessary to provide the oil flowing to the generator G1 with a slight pressure, so that G1 needs not draw this oil to its inlet and which ensures complete filling (volumetric efficiency=100%) by supplying a slight pressure stream. These problems of flushing, leakage oil replacement and complete filling of the circuit are settled after reversal of K4 by the control oil supplied by the control pump G2. Flushing oil enters the operating circuit via the duct 26. The excess amount of oil in the circuit previously passes from the circuit by the duct 35 (the impossibility of the flushing oil supplied flowing against the stream guarantees this) and flows via the reversing valve K4, the ducts 36, 37, a counterpressure valve V2 and the duct 38 to the reservoir 22. The valve V2 produces a slight counterpressure. The operating piston K1 moves downwardly in the drawing, whereby the operating piston K1 operates in the closed circuit of the generator G1. The accuracy of the drive and the dissipation of heat from the circuit are ensured by the pressure flushing by the generator G2.

The reversal gear of K1 is represented in this case by electric means. An abutment A1 connected with the pre-control valve K3 or the machine element to be driven compresses a contact T1, whereby the magnet M4 withdraws and switches the pre-control valve K3 into the right-hand position. In opposite movement of the operating piston K1, the abutment A2 actuates the contact arrangement T2, which then energises the associated magnet M3. This alteration of the pre-control valve K3 can also be effected by other means, as shown for example in Figs. 2 and 3.

The control oil from G2 flows through the duct 24, through K3 and the duct 39 to the reversing valve K4. This then moves to the right, since the oil is returned to the container 22 from the duct 25 via K3 and the duct 41 and 42. In the left-hand switching position of K3, return flow to the container or reservoir occurs via the connection 53 which is connected to the duct 41. A weakly stressed counterpressure valve V3 ensures oil filling in the control ducts. With the alteration of the reversing valve K4, the generator G1 is now brought in the manner described by means of the crank 9 into the opposite eccentric position. The pressure oil stream, which previously flowed to the duct 27 and via the duct 34 is reversed, is thus slightly decreased. In the zero position, the pressure oil stream is completely arrested momentarily and, with the over-zero pivoting towards the opposite eccentricity, the pressure oil stream flows to the duct 34 and back via the duct 27. The direction of movement of the operating piston K1 has thus reversed and proceeds as described above.

It is necessary in the reversal for the speed of the operating piston K1 to be decreased by the amount that the generator G1 is swung from its previous stroke into the zero position and for K1 to accelerate to the same extent in the reverse direction, as G1 is pivoted into the other stroke direction. This means that the oil displaced in the downward movement of K1 through the ducts 31, 32, 33 and 34 is backed up against G1 during the deceleration of K1. The flushing of the circuit oil must be halted during the reversal phase, so that the braking energy required for braking K1 corresponding to the existing velocity and the moved masses is only transmitted to G1 via the displacement ducts and the oil taken from G1 always remains equal to the oil stream supplied during the pivoting of the generator. If the flushing were still open, K1 could continue unchecked in that the displaced oil, by which the braking energy is transmitted, could escape to the reservoir 22 through the flushing ducts via the flushing valve V2. With the shifting or changing over of the reversing valve K4, shutting of the flushing oil ducts 26 and 36 occurs first.

During the reversal, the circuit is thus completely closed and the reversal of K1 occurs in an accurate and rigid dependence upon the pivoting of the generator G1 to the opposite eccentricity. If the braking of K1 were effected as previously by braking or throttle valves, firstly the risk would arise that the braking of K1 would not occur in the exact relation to the pivoting of the generator, secondly the braking energy would be lost and converted into heat, and thirdly the accuracy of the drive would be prejudiced, for if K1 is not reversed in exact relationship with the pivoting of G1, the uniformity of the oil flows at 27 and 34 is disturbed. If K1 comes to a standstill more rapidly than corresponds to pivoting of G1 from the middle position, for example, by means of a brake valve, a vacuum is produced at 34, which would undeniably lead to air entry into the generator. If however, K1 were brought to a standstill more slowly than corresponds to the pivoting of G1, a vacuum would be formed at 27 and the same risk of air entry during the reversal would be involved. This exact dependence of the deceleration of K1 upon the pivoting of G1 is not possible in practice with braknig or throttle valves, since the velocity of K1 alters continuously and frequently, and the alternating masses, such as the table planing machine for example, are also subject to variation.

By the present invention, the accuracy of the drive is ensured by the completely enclosed circuit during the reversal, since deceleration and further acceleration of K1 follow exactly according to the alteration of the position of the adjusting member 11 of the pump or generator G1 (over-zero control). The deceleration energy is not converted into heat, but operates instead upon the generator G1 and hence the electro-motor and is taken up and employed by this according to its characteristics.

If reversal is effected by K4, the pressure stream from the generator G2 flows by route-sequence control through the duct 39 to the duct 43 and flushes the circuit of G1. After the reversal, 34 becomes the pressure duct and the displaced oil flows back to the generator G1 at 27. Flushing still occurs via the ducts 44, K4, the ducts 45 and 47, the flushing valve V2 and the duct 38 to the container 22.

The reversal is absolutely accurate by the exactly proportional dependence of the strokes of G1 and G2. Over all velocities of K1, by the different eccentric strokes of G1 and the proportional adjustment of G2 connected therewith, the acceleration and deceleration paths always remain constant. A deviation of the reversal point (zero point) cannot occur, consequently.

The switch valve K2, which is magnet-controlled likewise, serves for switching off the machine, that is for bringing K1 to rest. The driving position is illustrated. If the magnet M2 is energized, the generator G1 supplies either via the duct 29 or 32 to the container ducts 46 or 47. The magnet M1 serves for connecting or switching on the drive and reversing the valve K2 into its driving position. K1 is hence locked by shutting off the ducts 30 and 31. In order to avoid a sudden stop, the double-acting valve V4 is provided, which is connected via the ducts 49 and 50 with the two cylinder chambers of the operating cylinder 1. At the same time, the valve V4 serves as a safety valve, via which the oil can escape to the duct 48 and the container 22.

The pressure stream from G2 is divertable by the overpressure relief valve V1 via the ducts 51 and 52, which does not normally take place in practice.

With higher forces to be delivered, e.g. cutting forces, the provision of a full piston surface and a one-sided piston rod is frequently a constructional requirement, so that the assumptions of the classic system of Fig. 1 (equal cross-sections with the same volumes on either side of operating piston K1) are no longer given. For an operating piston with a one-sided rod, which exerts medium strokes and has to provide medium cutting forces, Fig. 2 shows a control arrangement suitable therefor. In this arrangement according to Fig. 2, the basic principle according to the illustration in Fig. 1 is adhered to, but in order to obtain higher velocities and greater numbers of strokes a rigid and oscillation-free drive is obtained in which the braking energy is no longer converted into heat.

In the arrangement according to Fig. 2, the drive of the piston K1 mounted in the operating cylinder housing 1 is effected by means of a generator G1 and a gear pump ZP. Instead of the gear pump, a second generator G2 could be used exactly as shown in Fig. 1. The principle of the reversal is the same as in Fig. 1. A reversing slide valve K4 moves a crank 9 which pivots about a pivot point 10. The pivot point 10 is adjustable by means of a sleeve 17 by means of a spindle 16. The adjustment is effected by a hand wheel 13 and gears 54. The setting member 11 of the generator G1 is pivoted in the crank 9 by means of a pin 12. The pivoting of the generator is therefore effected with the same positive or negative stroke on either side of the zero position. The alteration of the eccentricity, positive or negative, is caused by adjustment of the pivot point 10 of the crank 9 in the manner described. In order to maintain the same acceleration and deceleration strokes for all velocities of the operating piston K1 and hence an exact fixing of the reversal point, a throttle DR is provided, which regulates the control oil in accordance with the adjustment of G1. The throttle is connected via gear wheels 55 with the adjusting spindle 16. This thus gives the relation that the full stroke of G1 corresponds to a full control oil amount, a half stroke of G1 to a half control oil amount and so on.

In the position illustrated, pressure oil flows from the generator G1 via ducts 56, 57 and 58 to the full piston surface F1 of K1. From the annular surface F2, displacement of the oil via the ducts 59, 60, 61, 62 and 63 back to the generator G1 occurs. In the ratio of F2:F1, less oil flows back to the generator at 63 than is delivered at 56. The missing oil amount is replaced with an addition of flushing oil by the gear pump. The gear pump extracts via the duct 64 and supplies through the duct 65 to the pre-control slide valve K3. In the position of K3 shown, the control oil flows through the duct 66 to the reversing valve K4 and this moves towards the left. Because of the arrival of valve K4 in its left-hand position, it passes via the ducts 67, 68 to the circuit, fills this and an excess amount of flushing oil passes via the duct 69, K4 and the duct 70 to the reservoir 22. The duct 70 is provided with a light counterpressure by means of valve V2b.

With the reversal of K1, the circuit shall now be completely closed, so that K1 will operate in the reversal exactly in conformity with the timing given by the shifting of the adjusting member 11 of generator G1. In order to be able to close the circuit on reversal and hence maintain the volumetric uniformity of the outflowing pressure oil at 56 and the inflowing amount at 63 or vice versa, volume compensating pistons KA and KB are provided.

The volume compensating piston KA has surfaces $f1$, $f2$ and $f3$, which are in the following relation to one another: $f1+F2>f3$ and $f3:f1=F1:F2$. KB has the surfaces $f4$, $f5$ and $f6$, which stand in the following relation to one another: $f5+f6<f4$ and $f6:f4=F2:F1$.

Reversal on the end of the left position illustrated is initiated by the abutment A2, which engages a control shaft 71 which moves the pre-control valve K3 to the right by means of gear rack connection 72. The control oil flows from the duct 65 via K3 into the duct 73 and shifts K4 to the right. On beginning shifting of K4, the flushing is closed off. A vacuum would arise in the exhaust ducts 59—63 of the circuit, if the control oil would not have moved the compensating piston KB to the right via the duct 74. Oil is hence taken up at $f6$ and is discharged at $f4$. Since by this movement of KB, with the surface relationship given, the volumetric compensation of the pressure oil at 56 and the exhaust oil at 63 is produced, the circuit can be considered closed in the phase of reversal. The braking energy of the operating piston K1 is taken up by the generator G1. It is to be noted that the reversal pressure of the control oil, with alteration of K4 and hence of the generator G1, assumes a high value, which increases in proportion to the reversal velocity. This reversal pressure must be greater than the braking pressure, which is given directly by the essentially smaller cross-sectional surface of K4 with respect to F2. In this way it is sure that the braking pressure, which acts on $f6$, and the reversal pressure, which acts on $f5$, will together give a greater force than the braking pressure which acts on $f4$. Since with the beginning of reversal operating piston K1 bears against the exhaust ducts 59—63, as a result of the moment of inertia, the pressure in the ducts 56—58 is decreased.

The high control pressure occurring during reversal is strongly exerted via ducts 74 and 75 on the surface $f2$ of KA and the piston KA is moved to the left. This also has the advantage that, on beginning reversal, if the operating piston K1 bears against the exhaust ducts 59—63 and KB must be moved from rest, no vacuum can form, since the piston KA immediately compensates this vacuum. This movement of KB for volumetric compensation lasts from the beginning of pivoting of the generator G1 until it assumes its zero position, which is the middle position of K4. The direction of flow changes on beginning pivoting of G1 over the zero position and leads via the ducts 63—59 to the annular surface F2 of K1. The exhaust is effected from the full surface F1 via the ducts 58—56 to G1. The flushing and hence the volumetric compensation are however only produced again after complete reversal of the reversing valve K4. The volume compensating piston KA is consequently moved to the right, in order to provide for the volume compensation and closure of the circuit during the second phase of the forward control. If the reversing valve K4 has attained its right-hand end position, the control oil flows from 65 via K3, the duct 73, K4 and the ducts 76, 68 into the circuit at 63. The return is thus not only accelerated in the ratio $F1:F2$, but additionally by the amount of control oil. It would naturally also be possible to operate according to Fig. 1 or 3 and lead fresh oil into the exhaust line. Flushing in this case takes place with fresh oil, for the excess oil entering at 56, which cannot be taken up by the generator G1, then flows via the duct 77, controlled by K4, through the duct 78 to the container 22, wherein a slight pressure is maintained by the counterpressure valve V2a.

During this movement of K1 to the right (return), all surfaces of the two volume compensating pistons KA and KB are under the same flushing pressure. The two volume compensating pistons are consequently shifted into the preparatory position to the left.

Return reversal of K1 is effected by the abutment A1. By the control shaft 71 and its toothed engagement with K3, this is brought into the position shown. The control oil again flows from the duct 65 through K3 and the duct 66 to the reversing valve K4 and moves this to the left. On the beginning of reversal of K4, the flushing at 76, 77 and 78 is closed off, so that a closed circuit is present. The greater amount of oil now present in the ratio of $F1:F2$ in the first phase of reversal immediately shifts the volume compensating piston KA to the right, by acting upon $f3$ and $f1$. Since the shifting of KA is effected by a ramming pressure, a pressure decrease in the ducts 59—63 does not occur this time and the piston KB remains in the position shown. In the second phase of reversal, after change of the direction of flow to the duct 56, return acceleration of K1 to the left begins. So long as the reversing valve K4 has not reached its end position, less oil is supplied to the circuit from the annular surface F2 via the ducts 59—63 to the generator G1. For compensation, KB moves towards the right. After the complete reversal of K4 the surfaces $f4$, $f5$ and $f6$ are at the same pressure, whereby KB again goes into its preparatory position. KA is held during this advance in the right-hand position and is only shifted to the left at the beginning of reversal.

Since oil is removed from the oil stream to the gear pump ZP during reversal by the movement of the volume compensating pistons KA and KB, in proportion to the increasing amount with increasing velocity of the rectilinear alternating motion, the control accuracy of the piston drive K1 would be somewhat impaired. The latter is compensated for, in that the regulation of the gear pump ZP or the adjustment of the throttle DR is not effected in proportional dependence upon the adjustment of the stroke of the generator G1, but in a corrected ratio. With increasing velocity of the rectilinear alternating movement of K1, the amount of oil from the gear pump ZP must be made to increase additionally.

In the arrangement according to Fig. 2, the operation of the reversing valve K4 occurs in proportion to the adjusted eccentric stroke of the generator G1. Through the driving arrangement and the guide of G1, a proportional adjustment of the throttle DR occurs. This throttle DR is located in the outflow duct 79 to the container 22. The other connection of the throttle DR is connected via a duct 80 on the one hand with the outflow duct 81 and on the other hand with the outflow duct 82 of the pre-control valve housing K3, so that the return flow occurring on reversal of the reversing valve K4 is always passed via the ducts 73 and 66 via the throttle DR.

For machines with high forces to be delivered, e.g. high cutting forces, a large effective piston surface must be available. The return stroke being an idle motion should be considerably accelerated. It is hence immaterial whether this is achieved by a single-sided piston surface or whether the surfaces F1 and f1 are formed by two separately constructed plunger pistons. An embodiment is shown in Figs. 3 and 3a.

The principle of Fig. 1 is also adhered to here. Its fundamental mode of operation is as follows: The generator set consists of the gear pump ZP and the two reversible generators G1 and G2 of infinitely variable stroke, connected in aiding relation. In the operating stroke to the left, the pressure oil flows from G1 to the ducts 83, 84 and is connected there with the pressure oil from G2. The pressure oil of the two generators then flows via the duct 85 to the operating piston K1. The oil displaced by K1 flows via ducts 86, 87, 88 and 89 to the generator G1. It is preferable to construct the piston rod of K1 so that the annular surface $F2 = \frac{1}{2} F1$. This means that the piston rod cross-section F3 equals the annular surface, $F2 + F3 = F1$. In this way, generator $G1 = G2$. The displaced oil from K1 is taken up by G1 in the operative movement illustrated.

Flushing is provided by the gear pump, which withdraws oil via the duct 90. The pressure stream from ZP flows through the duct 91, the switch valve K2, a duct 92, via the pre-control valve K3 and the duct 93 to the reversing valve K4, which is located in the right-hand position. After the reversal and the shifting of the reversing valve K4 to the left-hand position, the gear pump ZP, by virtue of the new position of K4, flushes by way of the ducts 94, 95, the feed control valve K5 and the duct 96 to the circuit in the out-flowing duct. The circuit oil flows via the duct 97, the reversing valve K4 and the ducts 98, 99, 100 and 101 to the container 22. The weakly stressed counterpressure valve V2 ensures the continual filling of the duct 100.

Reversal of the operating piston K1 is effected by the abutment A1 which compresses the contact T1. The contact transmission is provided hydraulically with a piston not shown, which, via the duct 102, switches the pre-control valve K3 to the right. In the reversal at the opposite end an abutment A2 actuates a contact T2, having a piston which returns the pre-control valve K3 to the left via a duct 103. The control oil of gear pump ZP flows from the duct 91 through switch valve K2, the duct 92, through pre-control valve K3 into the duct 104 and moves the reversing valve K4 to the right. Oil is thereby returned to the container 22 via the duct 93, K3, the ducts 105, 106 and the throttle DR via the duct 107. In the opposite position of the pre-control valve K3, the outflow to the throttle is effected via the duct 146 which communicates with the duct 106. The two generators G1 and G2 are pivoted beyond zero by the reversing valve K4, so that both generators are operated with the same but opposed eccentricities. The generator G1 operates via the ducts 89—86 on the annular surface F2 of operating piston K1. Twice the amount of oil is thus exhausted via ducts 85—83. The generator G2 takes up half the amount and supplies it via the ducts 108, 109, the return-advance piston K6 and the duct 110 to the container 22. The other half of the displaced oil of K1 flows to the generator G1, which directs it to the pressure duct 89. A closed circuit is thus also obtained on return. With this return movement, flushing occurs by gear pump ZP from the duct 104, the reversing valve K4 and the duct 112, which enters the circuit at 83. The oil flushed out from the circuit flows via the duct 113, the reversing valve K4, and the ducts 114, 99, 100, V2 and 101 to the reservoir 22.

Also in Fig. 3, therefore, the reversing operation occurs as in Figs. 1 and 2 with a closed circuit, which is flushed during the working stroke of the operating piston K1. In the phase of reversal, the flushing is switched off and the circuit is completely closed, so that the reversal of the operating piston K1 occurs exactly in proportion to the pivoting of the generators G1 and G2 as motors.

In the illustration of Fig. 3, a free-running or over-running coupling 116 is provided between the generators G1 and G2 and the driving electric motor 115. The generators can therefore be driven by the braking energy as hydraulic motors, and are released from the electro-motor 115 by the overrunning coupling 116. They assume a greater number of revolutions than the electro-motor 115 and thereby store up the braking energy. On completing reversal, if the generators must undergo a further loading for re-acceleration, the number of revolutions of the generators falls again to that of the electric motor 115.

The connection of the reversing valve K4 with the generators G1 and G2 is constructed analogously to that of Figs. 1 and 2. The crank 9 is again moved by the pin 8 of the reversing valve K4. The pivot point of the crank 9 is the pin 10 in the sleeve 17, which is adjusted by the spindle 16. The pivot parts of the generators are guided in a slide member 117 and are adjusted in slots 118, 119 with guide bolts 120 and 121. The slide member 117 is connected by the bolt 12 to the crank 9.

Setting is effected by the hand-wheel 13 which adjusts a spindle 18. In the forward movement illustrated, the advance-return piston K6 is moved against the spindle 18 by the control oil from the duct 122. The generator G2 hence draws oil by means of the duct 123 via the check valve SV and the ducts 124, 108. On return of the operating piston K1, the generator G2 returns half the amount to the circuit via the duct 108. The check valve SV then closes and the piston K6 is shifted to the left by the pressure built up in the duct 109, until the duct 110 is exposed. The generators G1 and G2 are thus supported via the drives 54, 55, during the working stroke of operating piston K1, against the adjustable spindle 18 of the hand-wheel 13; during the return stroke however the adjusting member of the generators will be shifted to the position corresponding to the highest stroke of the generator pistons in order to carry out the idle return stroke of the operating piston K1 with the highest velocity.

In order to hold constant the acceleration and deceleration paths, as illustrated in Fig. 1, the reversal velocity of the reversing valve K4 is held proportional to the eccentric stroke, positive or negative, of G1 and G2 for the embodiment of Fig. 3. The oil exhausted from reversing valve K4 at 93 or 104 flows via the throttle DR, which at the same time is adjusted with the alteration of the pivot point 10 of the crank 9. The proportionality between the oil amounts of the generators G1 and G2 in the circuit and the control oil in the gear pump ZP is thus ensured. Reversing accuracy is hence obtained.

In Fig. 3, an advance or a feed and rapid pass drive initiated by the elements of the main drive is illustrated. The advance or feed is preferably effected during the return reversal of K1. By the abutment A2 the hydraulic contact T2 has become depressed and K3 is thus located in the position shown. The control oil first reverses reversing valve K4 in the manner described and then flows via ducts 94, 95 to K5. The feed or advance valve K5 is first located in the position illustrated in Fig. 3a. The control oil from the duct 95 flows through the small aperture 125 and the ducts 126, 127 and from there via the feed switch on and off valve K9, the ducts 128, 129 and the feed direction valve K7, the duct 130 to the advance or feed motor VM. This is set in rotation and forces oil from the duct 131, the feed direction valve K7 and the ducts 132, 133 to the feed metering piston K8. The piston K8 meters a predetermined adjustable amount of oil. This volumetric metering and hence the number of revolutions of VM are adjusted at the spindle 134 of feed metering piston K8. If the piston K8 engages with the spindle 134, no further oil flow can occur. The feed valve K5 according to Fig. 3a is located in the left-hand position as long as the oil is flowing, for a pressure drop occurs through the small aperture 125. The same pressure prevails on both sides of feed valve K5 with the cessation of oil flow and feed valve K5 now moves into the position shown in Fig. 3 because of the greater left-hand slide valve surface.

The control oil then flows in the manner described to the duct 96 for flushing during the working stroke of operating piston K1. On return of the operating piston K1, the pre-control valve K3 is located in the right hand position. Feed valve K5 is again sent to the left and prepared for a new advance or feed switching, for the oil behind feed valve K5 can then flow out via the ducts 126, 111 and K3 and the duct 135 to the container 22. A spring 136 presses feed valve K5 back. At the same time, the feed metering piston K8 discharges to the container 22 via the ducts 133, 137, 138, K3 and 135. The feed metering piston K8 is brought into the starting position by the flushing oil supplied via the duct 139.

The reversal of the advance or feed into the opposite direction is effected by feed direction valve K7, in that control oil entering at 129 does not pass via 130 but via 131 and the exhaust is effected via 130, K7, 140 and 133 to the feed metering piston K8.

Switching off the advance or feed occurs by means of the feed switch valve K9, which can shut off the control oil coming from 127.

If the main drive is arrested by means of the main switch valve K2, the control oil no longer flows along 92 but passes via the duct 141 to the rapid pass or rapid feed valve K10. Here the duct 141 is first cut off. If K10 is urged against the pressure of the spring 142, the control oil flows via the ducts 143, 129, K7 and 130 to the advance motor VM. The exhaust from the motor VM is effected via 131, K7, 132, 137 and 144 via K10 to the container 22. As long as K10 is depressed, rapid passing occurs. On release of K10, rapid passing is discontinued.

If K10 is shifted during the operating movement of K1, this is ineffective, since with the connection of main switch valve K2 the flow of control oil is disconnected between the ducts 91 and 141. The rotary valve K2a is coupled with main switch valve K2, so that on switching off valve K2 the circuit of the generators G1, G2 is short-circuited via the duct 145 and the operating piston K1 is blocked.

The points 1–10, which were referred to in the introduction as being the conditions to be fulfilled by hydraulic drive for rectilinear alternating motions, are thus particularly effectively realised with the arrangements according to Figs. 1–3. It is ensured that both technical advances and also the requirement of greater efficiency are fulfilled to the optimum. With this invention, the hydraulic drive of rectilinear alternating motion on machines of all kinds is placed on a higher standard. The operating velocities can be increased, since the question of reversal is solved both kinematically and with respect to the power to be achieved.

The accumulation of the braking energy is clearly effective for all three figures. In no phase of the movement is kinetic energy dissipated or converted into heat. Therefore, this hydraulic drive is not substantially different as regards over-heating than mechanical drives. Its independence of climatic conditions is therefore given. A great advance is the absolute reversal accuracy, which is not always ensured in mechanical and electrical drives. The reveral strokes of the alternately moved machine element is expressed in the following formula:

$$s = \frac{v \cdot t}{2}$$

If $s$ is constant, the product $v \cdot t$ must also be constant.

$v$ = velocity of the machine element, e.g. the table of a planer $t$ = reversal time $v$ is dependent upon G1 in Figs. 1 and 2 and is dependent upon $G1+G2$ in Fig. 3

$t$ is dependent upon the control pump G2 in Fig. 1; in Figs. 2 and 3, $t$ is dependent upon ZP.

The path of the reversing slide valve K4 is not involved, since it remains constant. If $v$ is large, then $t$ must be small; if $v$ is small, then $t$ is large. The absolutely proportional dependency of the generator and the control flow consequently gives the constant value from the product $v \cdot t$.

*Example with respect to the embodiment of Fig. 1*

(a)   G1 = 100 l./minute; G2 = 10 l./minute
(b)   G1 = 25 l./minute; G2 = 2.5 l./minute Since the surface of the operating piston K1 is constant, it is assumed to be 10 cm.$^2$.

Since the product-slide valve surface x stroke of reversing valve K4 is constant, it is assumed to be constant at 1 cm.$^3$.

(a)   $v = 10{,}000$ cm./min.; $t = \frac{1 \text{ cm.}^3/\text{min.}}{10{,}000 \text{ cm.}^3}$ (b)   $v = 2500$ cm./min.; $t = \frac{1 \text{ cm.}^3/\text{min.}}{2500 \text{ cm.}^3}$ (a)   $v \cdot t = 1$;   (b) $v \cdot t = 1$

What I claim is:

1. In a hydraulic drive for effecting alternating rectilinear motion, a cylinder, a piston within said cylinder adapted to be connected to a driven machine member, first and second chambers of varying volume defined by said piston, means for generating hydraulic pressure including a variable delivery pump, conduit means connecting one side of said generating means with said first chamber and connecting the other side of said generating means with said second chamber, an adjusting member movable from a neutral position in either direction for infinitely varying the output capacity of said generating pump and for reversing the flow direction thereof, a reciprocable actuating member having a stroke of predetermined length, means responsive to arrival of said piston at a definite position for causing said actuating member to shift through said predetermined stroke, and connecting means between said actuating member and said adjusting member for causing a constant shifting of said adjusting member during the movement of said actuating member, the position of said adjusting member at any instant being proportional to the position of said actuating member.

2. The combination according to claim 1, said actuating member and adjusting member both being movable on opposite sides of a common axis of symmetry, said pump having a zero output capacity when said adjusting member is positioned on said axis.

3. The combination according to claim 2, further provided with adjusting means for varying the maximum position of said adjusting member on either side of said axis when said actuating member has reached its extreme position.

4. In a hydraulic drive for effecting alternating rectilinear motion, a cylinder, a piston within said cylinder adapted to be connected to a driven machine member, first and second chambers of varying volume defined by said piston, means for generating hydraulic pressure including at least one variable delivery pump, conduit means connecting one side of said generating means with said first chamber and connecting the other side of said generating means with said second chamber, an adjusting member movable from a neutral position in either direction for infinitely varying the output capacity of said generating pump and for reversing the flow direction thereof, a reciprocable actuating member having a stroke of predetermined length, means responsive to the arrival of said piston at a definite position for causing said actuating member to shift through said predetermined stroke, connecting means between said actuating member and said adjusting member for securing a constant shifting of said adjusting member from one side of its neutral position to the other during the movement of said actuating member, the rate of movement of said adjusting member being proportional to the rate of movement of said actuating member, and output selector means for varying the proportion of said adjusting member movement with respect to said actuating member movement, whereby the maximum output of said generating pump may be selected.

5. In a hydraulic drive for effecting alternating rectilinear motion, a cylinder, a piston within said cylinder adapted to be connected to a driven machine member, first and second chambers of varying volume defined by said piston, means for generating hydraulic pressure including at least one variable delivery pump, conduit means connecting one side of said generating means with said first chamber and connecting the other side of said generating means with said second chamber, an adjusting member movable from a neutral position in either direction for infinitely varying the output capacity of said generating pump and for reversing the flow direction thereof, a reciprocable actuating member having a stroke of predetermined length, means including a variable delivery control pump responsive to the arrival of said piston at a definite position for causing said actuating member to shift through said predetermined stroke, connecting means between said actuating member and said adjusting member for securing a constant shifting of said adjusting member from one side of its neutral position to the other during the movement of said actuating member, the rate of movement of said adjusting member being proportional to the rate of movement of said actuating member, output selector means for varying the proportion of said adjusting member movement with respect to said actuating member movement, whereby the maximum output of said generating pump may be selected, a setting member for infinitely varying the output of said control pump between zero and a maximum, and means for shifting said setting member in proportion to the position of said output selector means.

6. In a hydraulic drive for effecting alternating rectilinear motion, a cylinder, a piston within said cylinder adapted to be connected to a driven machine member, first and second chambers of varying volume defined by said piston, means for generating hydraulic pressure including at least one variable delivery pump, conduit means connecting one side of said generating means with said first chamber and connecting the other side of said generating means with said second chamber, an adjusting member movable from a neutral position in either direction for infinitely varying the output capacity of said generating pump and for reversing the flow direction thereof, a reciprocable actuating member having a stroke of predetermined length, means including a variable delivery control pump responsive to the arrival of said piston at a definite position for causing said actuating member to shift through said predetermined stroke, connecting means between said actuating member and said adjusting member for securing a constant shifting of said adjusting member from one side of its neutral position to the other during the movement of said actuating member, the rate of movement of said adjusting member being proportional to the rate of movement of said actuating member, output selector means for varying the proportion of said adjusting member movement with respect to said actuating member movement, whereby the maximum output of said generating pump may be selected, a throttle valve in circuit with said control pump, a setting member for varying the effect of said throttle valve, and means for shifting said setting member in proportion to the position of said output selector means.

7. In a hydraulic drive for effecting alternating rectilinear motion, a cylinder, a piston within said cylinder adapted to be connected to a driven machine member, first and second chambers of varying volume defined by said piston, means for generating hydraulic pressure including at least one variable delivery pump, conduit means connecting one side of said generating means with said first chamber and connecting the other side of said generating means with said second chamber, an adjusting member movable from a neutral position in either direction for infinitely varying the output capacity of said generating pump and for reversing the flow direction thereof, a reciprocable actuating member having a stroke of predetermined length, means responsive to the arrival of said piston at a definite position for causing said actuating member to shift through said predetermined stroke, connecting means between said actuating member and said adjusting member for securing a constant shifting of said adjusting member from one side of its neutral position to the other during the movement of said actuating member, the rate of movement of said adjusting member being proportional to the rate of movement of said actuating member, output selector means for varying the proportion of said adjusting member movement with respect to said actuating member movement, whereby the maximum output of said generating pump may be selected, a source of hydraulic pressure for flushing the hydraulic circuit which includes said generating pump and cylinder, means connecting said hydraulic pressure source to said circuit, and means for disconnecting said source from said circuit during the shifting movement of said adjusting member.

8. In a hydraulic drive for effecting alternating rectilinear motion, a cylinder, a piston within said cylinder adapted to be connected to a driven machine member, first and second chambers of varying volume defined by said piston, means for generating hydraulic pressure including at least one variable delivery pump, conduit means connecting one side of said generating means with said first chamber and connecting the other side of said generating means with said second chamber, an adjusting member movable from a neutral position in either direction for infinitely varying the output capacity of said generating pump and for reversing the flow direction thereof, a reciprocable actuating member having a stroke of predetermined length, means including a variable delivery control pump responsive to the arrival of said piston at a definite position for causing said actuating member to shift through said predetermined stroke, connecting means between said actuating member and said adjusting member for securing a constant shifting of said adjusting member from one side of its neutral position to the other during the movement of said actuating member, the rate of movement of said adjusting member being proportional to the rate of movement of said actuating member, output selector means for varying the proportion of said adjusting member movement with respect to said actuating member movement, whereby the maximum output of said generating pump may be selected, flushing means including said control pump for flushing the hydraulic circuit which includes said generating pump and cylinder, means connecting said control pump to said circuit, and means for disconnecting said control pump from said circuit during the shifting movement of said adjusting member.

9. In a hydraulic drive for effecting alternating rectilinear motion, a cylinder, a piston within said cylinder adapted to be connected to a driven machine member, first and second chambers of varying volume defined by said piston, means for generating hydraulic pressure including at least one variable delivery pump, conduit means connecting one side of said generating means with said first chamber and connecting the other side of said generating means with said second chamber, an adjusting member movable from a neutral position in either direction for infinitely varying the output capacity of said generating pump and for reversing the flow direction thereof, a reciprocable valve member having a stroke of predetermined length, means including a variable delivery control pump responsive to the arrival of said piston at a definite position for causing said valve member to shift through said predetermined stroke, connecting means between said valve member and said adjusting member for securing a constant shifting of said adjusting member from one side of its neutral position to the other during the movement of said valve member, the rate of movement of said adjusting member being proportional to the rate of movement of said valve member, output selector means for varying the proportion of said adjusting member movement with respect to said valve member movement, whereby the maximum output of said generating pump may be selected, flushing means including said control pump for flushing the hydraulic circuit which includes said generating pump and cylinder, means including said valve member for connecting said control pump to said circuit, and means including said valve member for disconnecting said control pump from said circuit during the shifting movement of said adjusting member.

10. A hydraulic drive as claimed in claim 9 in which said chambers are of different cross-sectional areas, each of said two conduit means being connected to volume compensating elements for compensating the volume differences of hydraulic fluid flowing through said two conduits during the shifting movements of said adjusting member.

11. A hydraulic drive as claimed in claim 9 in which said chambers are of different cross-sectional areas, said hydraulic pressure generating means including two reversible generating pumps of constantly variable output capacity, means activatable during movement of said piston in one direction for causing both generating pumps to deliver fluid to the larger chamber and only one generating pump to withdraw fluid from the smaller chamber, and means activatable during movement of said piston in the other direction for causing only one generating pump to deliver fluid to the smaller chamber and both pumps to withdraw fluid from the larger chamber.

12. A hydraulic drive as claimed in claim 9, further provided with a motor for driving said hydraulic pressure generating means, and an overrunning coupling between said motor and generating means.

13. A hydraulic drive as claimed in claim 9, further provided with a separate hydraulically operated advance motor for advancing said piston in one direction, means for connecting said control pump to the input of said advance motor, and an adjustable restriction in the outlet of said advance motor for varying the speed thereof.

14. A hydraulic drive as claimed in claim 9, further provided with hydraulically operated means for causing rapid shifting of said piston, and a manually controllable valve for operating said rapid shifting means.

15. The combination according to claim 14, said rapid shifting means comprising an advance motor, means for connecting said control pump to the input of said advance motor, and an adjustable restriction in the outlet of said advance motor for varying the speed thereof.

16. The combination according to claim 14, further provided with selectively operable means movable between a first position enabling said hydraulic pressure generating means and disenabling said manually controllable valve, and a second position enabling said manually controllable valve and disenabling said hydraulic pressure generating means.

17. The combination according to claim 9, further provided with means for causing said control pump to operate with a relatively high pressure when said valve member is being shifted in one direction, and means for causing said control pump to operate at a relatively low pressure after said shifting of the valve member has caused reversal of said adjusting member.

18. In a hydraulic drive for effecting alternating rectilinear motion, a cylinder, a piston within said cylinder adapted to be connected to a driven machine member, first and second chambers of varying volume defined by said piston, means for generating hydraulic pressure including at least one variable delivery pump, conduit means connecting one side of said generating means with said first chamber and connecting the other side of said generating means with said second chamber, an adjusting member movable from a neutral position in either direction for infinitely varying the output capacity of said generating pump and for reversing the flow direction thereof, a reciprocable actuating member having a stroke of predetermined length, means including a variable delivery control pump responsive to the arrival of said piston at a definite position for causing said actuating member to shift through said predetermined stroke, the neutral position of said adjusting member being located on a common axis of symmetry for the movements of said adjusting and valve members, a rocking lever having a stationary pivot, a first pivotal connection to said valve member, and a second pivotal connection to said adjusting member, output selector means for varying the relative distance of said second pivotal connection to said first pivotal connection and said stationary pivot respectively, whereby the maximum output of said generating pump may be selected, a setting member for varying the output of said control pump, and means operably connecting said output selector means and setting member for simultaneous adjustment.

References Cited in the file of this patent

UNITED STATES PATENTS

| | | |
|---|---|---|
| Re. 21,708 | Ernst | Feb. 4, 1941 |
| 1,177,385 | Conradson | Mar. 28, 1916 |
| 1,998,189 | Erling | Apr. 16, 1935 |
| 2,273,721 | Muller | Feb. 17, 1942 |